US011471969B2

United States Patent
Tamm et al.

(10) Patent No.: US 11,471,969 B2
(45) Date of Patent: Oct. 18, 2022

(54) ORBITAL WELDING DEVICE WITH IMPROVED SECURITY AND REDUCED FAILURE PROBABILITY

(71) Applicant: Illinois Tool Works Inc., Glenview, IL (US)

(72) Inventors: Markus Tamm, Uberlingen (DE); Marcel Foh, Markdorf (DE)

(73) Assignee: Illinois Tool Works Inc., Glenview, IL (US)

( * ) Notice: Subject to any disclaimer, the term of this patent is extended or adjusted under 35 U.S.C. 154(b) by 349 days.

(21) Appl. No.: 16/136,840

(22) Filed: Sep. 20, 2018

(65) Prior Publication Data
US 2019/0091788 A1    Mar. 28, 2019

(30) Foreign Application Priority Data
Sep. 22, 2017  (DE) .......................... 102017122069.0

(51) Int. Cl.
*B23K 9/028*   (2006.01)
*B23K 37/02*   (2006.01)
(Continued)

(52) U.S. Cl.
CPC ........ *B23K 9/0286* (2013.01); *B23K 37/0276* (2013.01); *B23K 37/053* (2013.01);
(Continued)

(58) Field of Classification Search
CPC .... B23K 9/00; B23K 37/053; B23K 37/0276; B23K 37/0533; B23K 9/0286;
(Continued)

(56) References Cited

U.S. PATENT DOCUMENTS 3,586,221 A * 6/1971 Rosen .................... B23K 9/125
                                                      226/1
3,673,479 A * 6/1972 Horton ................. G05D 3/1472
                                                    318/750
(Continued)

FOREIGN PATENT DOCUMENTS

CN        103008939 A    4/2013
CN        103313816 A    9/2013
(Continued)

OTHER PUBLICATIONS

German Office Communication Appln. No. 102017122069.0 dated Mar. 2, 2021.

*Primary Examiner* — John J Norton
(74) *Attorney, Agent, or Firm* — McAndrews, Held & Malloy, Ltd.

(57) ABSTRACT

An orbital welding device (1) having a welding head (2), the welding head having a tubular mount (3) and a welding electrode holder (4) rotatably supported with respect to the tubular mount (3), the orbital welding device (1) having an electric motor (6) activated by a motor controller (5) of the orbital welding device (1), which is configured to drive the welding electrode holder (4) and thus to rotate the same with respect to the tubular mount (3), wherein the orbital welding device (1) has an electric torque measuring device (7), which is configured to measure a torque applied by the motor (6) to the welding electrode holder (4), wherein the torque measuring device (7) is connected to the motor controller (5), and wherein the motor controller (5) is configured to stop the motor (6) automatically if the torque exceeds a predetermined first torque.

6 Claims, 1 Drawing Sheet

(51) Int. Cl.
*B23K 37/053* (2006.01)
*B23K 26/282* (2014.01)
*B23K 101/06* (2006.01)

(52) U.S. Cl.
CPC ........ *B23K 37/0533* (2013.01); *B23K 26/282* (2015.10); *B23K 2101/06* (2018.08)

(58) Field of Classification Search
CPC .... B23K 2101/06; B23K 26/282; B23K 9/16; B23K 37/0217; B23K 37/0282; B23K 2101/10; B23K 9/328; B23K 9/122; B23K 9/0282; B23K 37/0211; B23K 37/0229; B23K 2201/06; B23K 9/0956; B23K 9/32; B29C 65/0636
USPC ......... 219/60 A, 59.1, 60 R, 60.2, 61, 125.1, 219/125.11–126, 137.31–144
See application file for complete search history.

(56) References Cited

U.S. PATENT DOCUMENTS

| | | | | |
|---|---|---|---|---|
| 3,873,798 A | * | 3/1975 | Friedman | B23K 9/0286 219/60 A |
| 4,009,360 A | * | 2/1977 | Beetham | B23K 9/0282 219/60 A |
| 4,038,509 A | * | 7/1977 | Henderson | B23K 9/0282 219/60 A |
| 4,161,640 A | * | 7/1979 | Bromwich | B23K 9/0282 219/124.1 |
| 4,168,406 A | * | 9/1979 | Torrani | B23K 9/1336 219/125.12 |
| 4,352,977 A | * | 10/1982 | Hardigg | B29C 66/91421 219/243 |
| 4,379,215 A | * | 4/1983 | Rohrberg | B23K 9/0286 219/161 |
| 4,628,181 A | * | 12/1986 | Pan | B23K 9/091 219/130.33 |
| 4,831,234 A | * | 5/1989 | Myers | B23K 9/028 219/125.11 |
| 4,841,115 A | * | 6/1989 | Severin | B23K 9/0286 219/125.11 |
| 5,196,664 A | * | 3/1993 | McGushion | B23K 9/0286 219/60 A |
| 5,220,144 A | * | 6/1993 | Jusionis | B23K 9/285 219/137.62 |
| 5,288,963 A | * | 2/1994 | Jusionis | B23K 9/0286 219/60 A |
| 5,571,431 A | * | 11/1996 | Lantieri | B23K 9/0953 219/130.01 |
| 5,837,966 A | * | 11/1998 | Timmons, Jr. | B23K 9/0286 219/124.34 |
| 6,380,505 B1 | | 4/2002 | Stoops | |
| 7,414,220 B2 | * | 8/2008 | Oyster | B23K 9/0286 219/60 A |
| 8,630,095 B2 | * | 1/2014 | Minato | H01L 23/49541 361/730 |
| 2006/0163230 A1 | * | 7/2006 | Kaufman | B23K 9/1336 219/137.71 |
| 2007/0119840 A1 | * | 5/2007 | Flattinger | H02K 7/083 219/137.31 |
| 2010/0025383 A1 | * | 2/2010 | Tiberghien | B23K 11/315 219/119 |
| 2010/0051586 A1 | | 3/2010 | Guerrina | |
| 2010/0089600 A1 | | 4/2010 | Borinato | |
| 2010/0096793 A1 | | 4/2010 | Falk | |
| 2010/0097879 A1 | * | 4/2010 | Krueger | A61B 17/8836 366/7 |
| 2011/0089146 A1 | * | 4/2011 | Takahashi | B23K 11/115 219/91.2 |
| 2011/0220629 A1 | * | 9/2011 | Mehn | B23K 9/1336 219/136 |
| 2013/0099710 A1 | * | 4/2013 | Okamoto | A61C 1/06 318/434 |
| 2013/0008269 A1 | * | 10/2013 | Li | B60S 9/06 74/89.34 |
| 2014/0263252 A1 | * | 9/2014 | Sadowski | B23K 9/1336 219/137.42 |
| 2017/0050668 A1 | | 2/2017 | Kikuchi | |
| 2017/0111003 A1 | * | 4/2017 | Kikuchi | H02K 3/28 |
| 2017/0136567 A1 | * | 5/2017 | Lahti | B65H 51/10 |
| 2017/0207467 A1 | * | 7/2017 | Shelton, IV | H01M 50/20 |
| 2017/0355037 A1 | * | 12/2017 | Brock | B23K 9/295 |

FOREIGN PATENT DOCUMENTS

DE 10341975 4/2005
DE 202014100284 2/2014

* cited by examiner

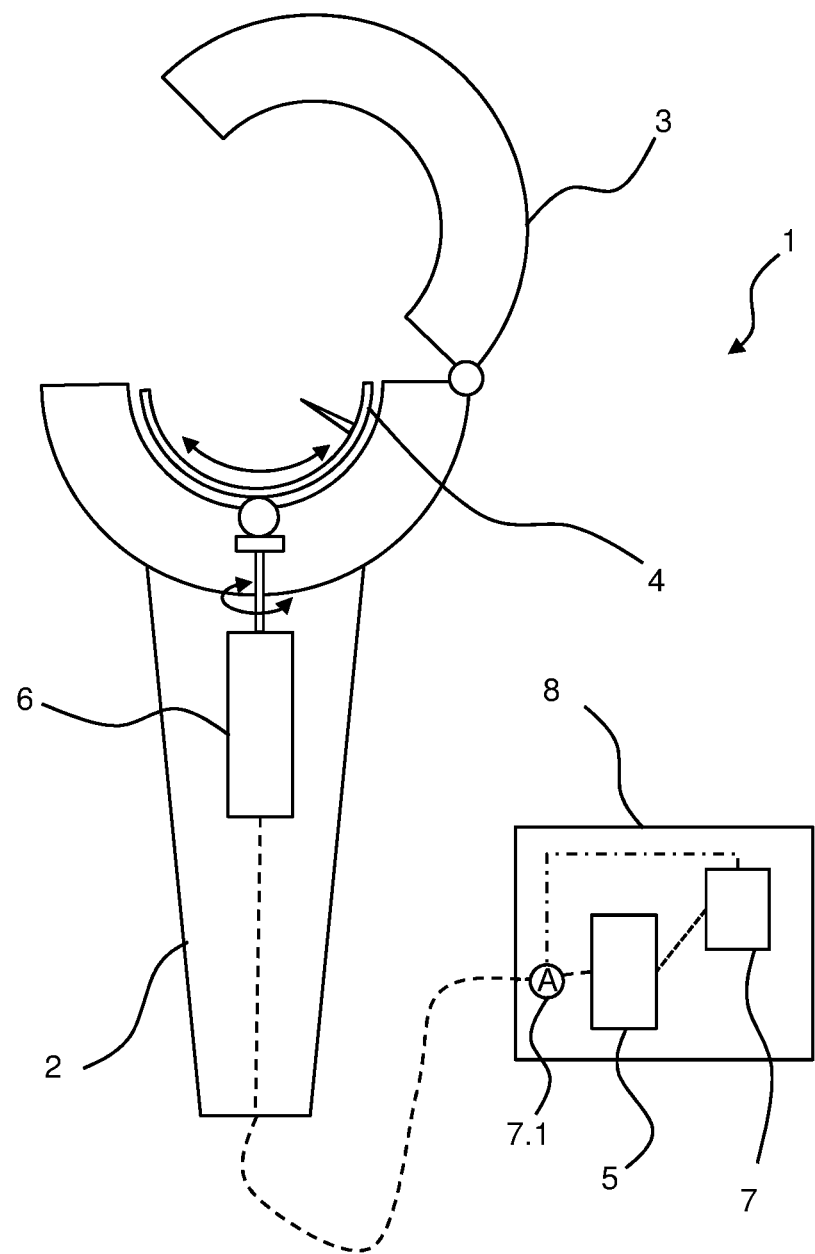

ORBITAL WELDING DEVICE WITH IMPROVED SECURITY AND REDUCED FAILURE PROBABILITY

CROSS-REFERENCE TO RELATED APPLICATION

The invention relates to an orbital welding device. Such a device is shown, for example, in DE 20 2014 100 284 U1.

BACKGROUND

A welding device is described in U.S. Pat. No. 6,380,505 B1, and it is mentioned in passing that, instead of an extension shaft, an adjustable slipping clutch can be used in order to increase user safety and to prevent damage. Nevertheless, the inventors found it worthy of improvement to increase the safety and reduce the probability of failure.

BRIEF SUMMARY

The object of the present invention is to carry out this improvement. The object is achieved by the independent claims. Advantageous developments are defined in the subclaims.

BRIEF DESCRIPTION OF THE DRAWING

FIG. 1 shows an orbital welding device having a welding head, the welding head having a tubular mount and a welding electrode holder rotatably supported with respect to the tubular mount, in accordance with aspects of this disclosure.

DETAILED DESCRIPTION

In particular, the object is achieved by an orbital welding device having a welding head, the welding head having a tubular mount and a welding electrode holder rotatably supported with respect to the tubular mount, the orbital welding device having an electric motor activated by a motor controller of the orbital welding device, which is configured to drive the welding electrode holder and thus to rotate the same with respect to the tubular mount, wherein the orbital welding device has an electric torque measuring device, which is configured to measure a torque applied by the motor to the welding electrode holder, preferably always when the motor is activated, i.e. is fed with a drive current, wherein the torque measuring device is connected to the motor controller, and wherein the motor controller is configured to stop the motor automatically if the torque exceeds a predetermined first torque.

The object is also in particular achieved by methods for operating an orbital welding device, including the steps:
  rotating a welding electrode holder of the orbital welding device with respect to a tubular mount of the orbital welding device by activating an electric motor by means of a motor controller of the orbital welding device,
  measuring a torque applied by the motor to the welding electrode holder by means of an electric torque measuring device, preferably always when the motor is activated, i.e. is fed with a drive current,
  automatically stopping the motor by means of the motor controller if the torque exceeds a predetermined first torque.

In this way, the safety is increased further and the probability of a defect of the device on account of jamming of the drive mechanism by foreign bodies is reduced. As opposed to the implementation with a slipping clutch, according to the invention the motor is stopped. The slipping clutch limits the torque at most and the motor then always still applies the limited torque to the drive mechanism.

The first predetermined torque is preferably stored in the orbital welding device. It is higher than the torque which is needed for a proper function of the orbital welding head and represents jamming of the welding electrode holder or a drive mechanism between motor and welding electrode holder.

A motor controller is preferably understood to mean one or more electric devices which is or are configured to influence an operating state (e.g. rotational speed, torque) of the motor directly or indirectly.

In a further exemplary embodiment of the present invention, the torque measuring device has a current measuring device, which is configured to measure an electric motor current for driving the motor as a value representing the torque. In a further method according to the invention, the electric torque measuring device measures the electric motor current for driving the motor as a value representing the torque, by means of a current measuring device.

In this way, by means of a current sensor, a simple measurement of a signal approximately proportional to the torque is made possible. The current measuring device is preferably a resistance in the current feed line to the motor, preferably of low resistance.

In a further exemplary embodiment of the present invention, the motor controller is configured to start the motor automatically in the opposite direction for a specific time or for a specific number of revolutions, directly after the motor has been stopped on account of exceeding the first predetermined torque. In a further method according to the invention, the motor is automatically started in the opposite direction for a specific time or for a specific number of revolutions by the motor controller, directly after the motor has been stopped on account of exceeding the first predetermined torque.

In this way, the safety is increased still further. Should an individual, for example, pinch a finger in the drive mechanism, it will possibly be freed again by the reverse travel.

In a further exemplary embodiment of the present invention, the motor controller is configured to stop the motor automatically again if the torque again exceeds the predetermined torque after the motor has been started in the opposite direction for a specific time or for a specific number of revolutions, directly after the motor has been stopped on account of exceeding the first predetermined torque. In a further method according to the invention, the motor is stopped again by the motor controller if the torque again exceeds the predetermined torque after the motor has been started in the opposite direction for a specific time or for a specific number of revolutions, directly after the motor has been stopped on account of exceeding the first predetermined torque.

In this way, the safety and the probability of a defect of the device on account of jamming of the drive mechanism by foreign bodies is still further reduced. Should the renewed jamming occur during the reverse travel (=torque exceeds the first predetermined first torque), the motor is again stopped.

In a further exemplary embodiment of the present invention, the orbital welding device is configured to output a visual and/or acoustic and/or haptic signal automatically or to transmit an electronic signal for visual and/or acoustic and/or haptic display on another device or to store the same on a storage unit if the torque continuously exceeds a second predetermined torque over a predetermined time period, wherein the second predetermined torque is lower than the first predetermined torque. In a further method according to the invention, the orbital welding device automatically outputs a visual and/or acoustic and/or haptic signal or it automatically transmits or stores an electronic signal for the visual and/or acoustic and/or haptic display on another device if the torque continuously exceeds a second predetermined torque over a predetermined time period, wherein the second predetermined torque is lower than the first predetermined torque.

In this way, detection of wear is made possible. Should the rotary mechanism gradually become more and more sluggish, for example as a result of soiling or the drying-out of lubricant, this can be established hereby. Either the user is given a visual and/or acoustic and/or haptic signal directly or a signal is transmitted, for example, to a central monitoring facility (e.g. main office of a construction firm), in order there to output a visual and/or acoustic and/or haptic signal, or this signal is stored on a storage unit, for example a storage chip of the orbital welding device, in order then, for example, to be read by a service engineer, who then receives the information about the occurrence of wear that has occurred, displayed by means of the visual and/or acoustic and/or haptic signal.

In a further exemplary embodiment of the present invention, the motor controller and the torque measuring device are arranged in a welding current source of the orbital welding device, while the motor is arranged in the welding head. In this way, the welding head can maintain easy-to-handle dimensions.

The invention is now to be illustrated further by way of example by using a drawing.

FIG. 1 shows an orbital welding device 1 having a welding head 2, the welding head having a tubular mount 3 and a welding electrode holder 4 rotatably supported with respect to the tubular mount 3. The orbital welding device 1 has an electric motor 6 activated by a motor controller 5 of the orbital welding device 1. The motor 6 is configured to drive the welding electrode holder 4 and thus to rotate the same with respect to the tubular mount 3. The orbital welding device 1 has an electric torque measuring device 7, which is configured to measure a torque applied by the motor 6 to the welding electrode holder 4. The torque measuring device 7 is connected to the motor controller 5. The motor controller 5 is configured to stop the motor 6 automatically if the torque exceeds a predetermined first torque.

The torque measuring device 7 has a current measuring device 7.1, which is configured to measure an electric motor current for driving the motor 6 as a value representing the torque.

The motor controller 5 and the torque measuring device 7 are arranged in a welding current source 8, while the motor 6 is arranged in the easy-to-handle welding head 2.

LIST OF DESIGNATIONS

1 Orbital welding device
2 Welding head
3 Tubular mount
4 Welding electrode holder
5 Motor controller
6 Motor
7 Torque measuring device
7.1 Current measuring device
8 Welding current source

The invention claimed is:
1. An orbital welding device, comprising:
 a weld head having a tubular mount and a welding electrode holder mounted rotatably with respect to the tubular mount;
 a motor controller;
 an electric motor, which is activated by the motor controller and is configured to drive the welding electrode holder to turn the welding electrode holder with respect to the tubular mount; and
 an electrical torque measuring device, configured to measure a torque applied to the welding electrode holder by the motor, wherein the torque measuring device is connected to the motor controller, and the motor controller is configured to stop the motor automatically if the torque exceeds a predetermined first torque;
 wherein the motor controller is configured to start the motor automatically in the opposite direction for a defined time or for a defined number of revolutions directly after the motor has been stopped in response to the predetermined first torque being exceeded.

2. The orbital welding device of claim 1, wherein the electrical torque measuring device has a current measuring device, which is configured to measure an electrical motor current for driving the motor as a value representing the torque.

3. The orbital welding device of claim 1, wherein the motor controller is configured to stop the motor again automatically if the torque exceeds again the predetermined torque after the motor has been started in the opposite direction for a defined time or for a defined number of revolutions directly after the motor has been stopped because of the first predetermined torque being exceeded.

4. The orbital welding device of claim 1, wherein the orbital welding device is configured to, in response to the torque exceeding a second predetermined torque throughout a predetermined time period, do one or more of: output at least one of a visual signal, an acoustic signal, or a haptic signal; send an electrical signal for at least one of visual output, acoustic output, or haptic output on another device; or store an indication on a storage unit, wherein the second predetermined torque is less than the first predetermined torque.

5. The orbital welding device of claim 1, wherein the motor controller and the electrical torque measuring device are arranged in a welding power source of the orbital welding device, while the motor is arranged in the weld head.

6. An orbital welding device, comprising:
 a weld head having a tubular mount and a welding electrode holder mounted rotatably with respect to the tubular mount;
 a motor controller;
 an electric motor, which is activated by the motor controller and is configured to drive the welding electrode holder to turn the welding electrode holder with respect to the tubular mount; and
 an electrical torque measuring device, configured to measure a torque applied to the welding electrode holder by the motor, wherein the torque measuring device is connected to the motor controller, and the motor controller is configured to stop the motor automatically if the torque exceeds a predetermined first torque;

wherein the motor controller is configured to, in response to the torque exceeding a second predetermined torque, do one or more of: output at least one of a visual signal, an acoustic signal, or a haptic signal; send an electrical signal for at least one of visual output, acoustic output, or haptic output on another device; or store an indication on a storage unit, wherein the second predetermined torque is less than the first predetermined torque; and wherein the motor controller is configured to start the motor automatically in the opposite direction directly after the motor has been stopped in response to the predetermined first torque being exceeded; and wherein the motor controller is configured to stop the motor again automatically if the torque exceeds again the first predetermined torque after the motor has been started in the opposite direction directly after the motor has been stopped because of the first predetermined torque being exceeded.

\* \* \* \* \*